March 18, 1930.  L. H. DEBS  1,751,268
BAKING PAN
Filed Sept. 27, 1928   3 Sheets-Sheet 1
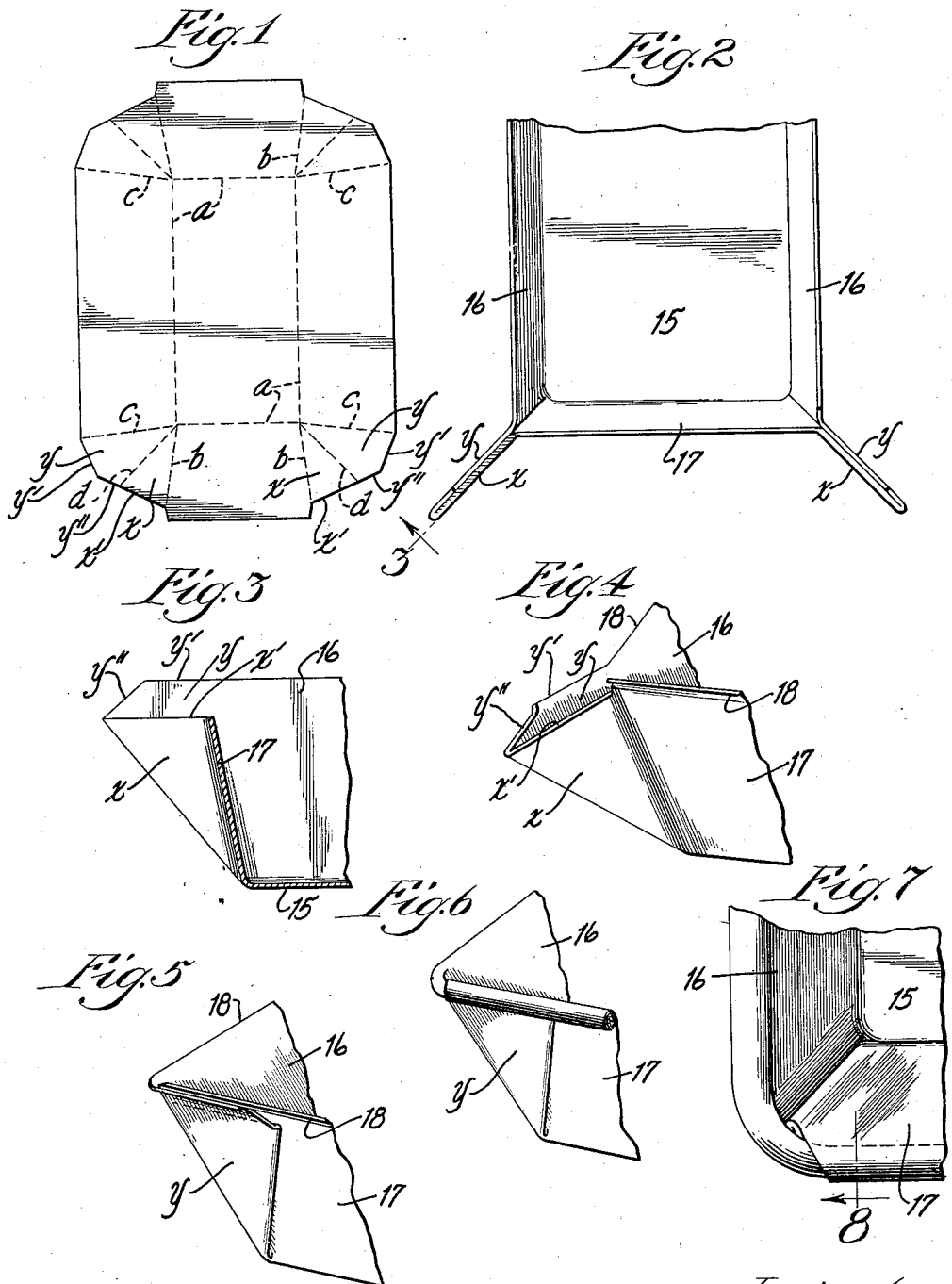

March 18, 1930. L. H. DEBS 1,751,268
BAKING PAN
Filed Sept. 27, 1928 3 Sheets-Sheet 2
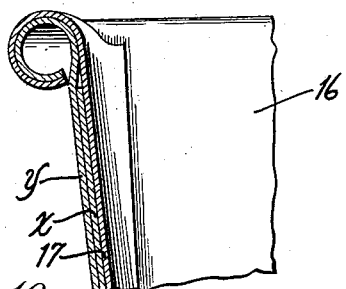
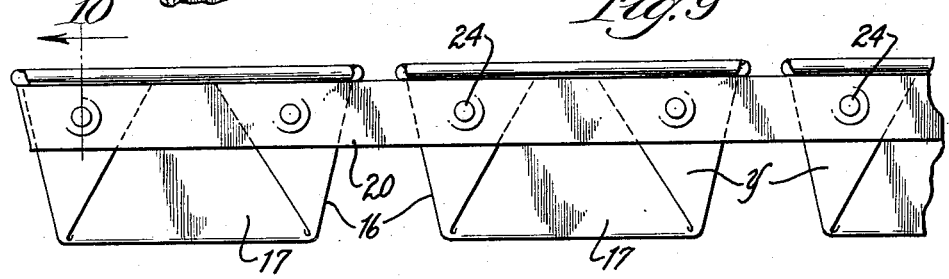
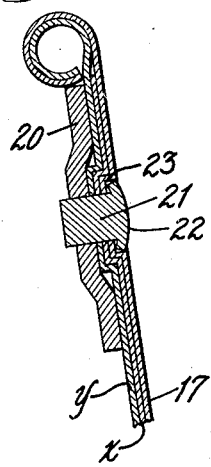
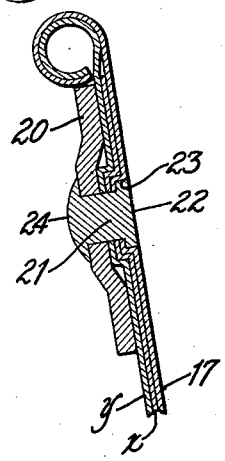
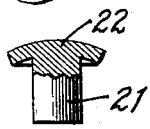
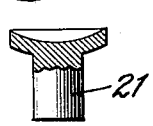

March 18, 1930. L. H. DEBS 1,751,268
BAKING PAN
Filed Sept. 27, 1928 3 Sheets-Sheet 3
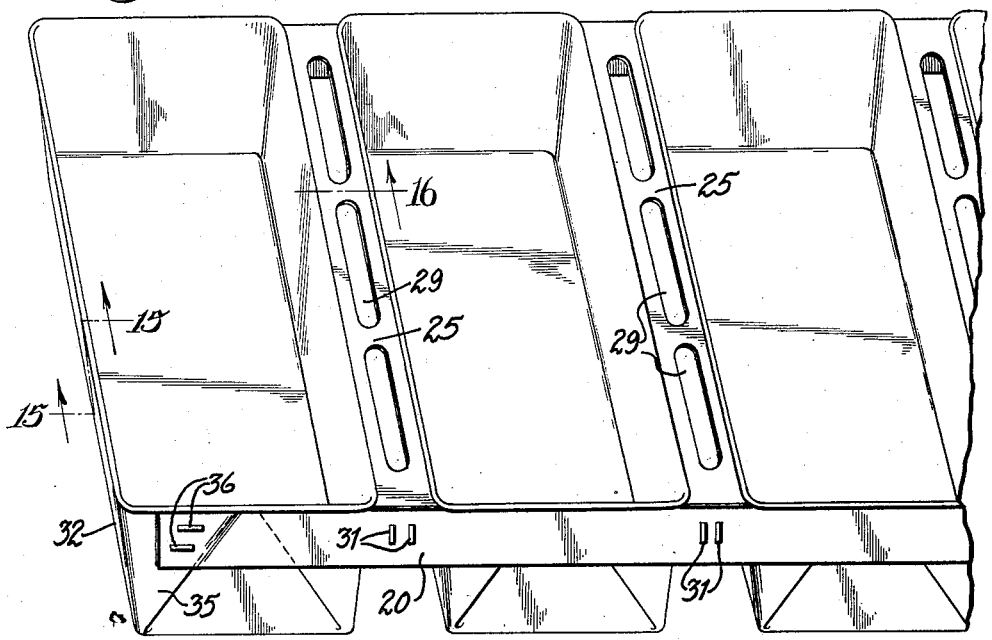
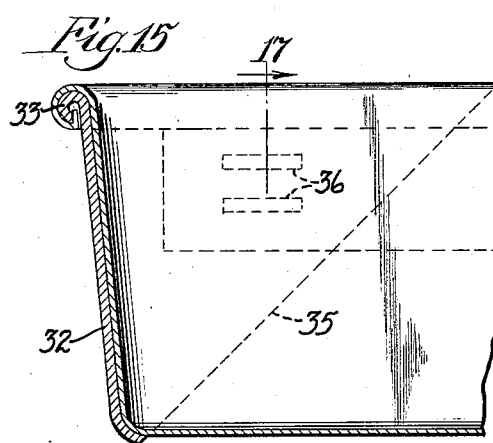
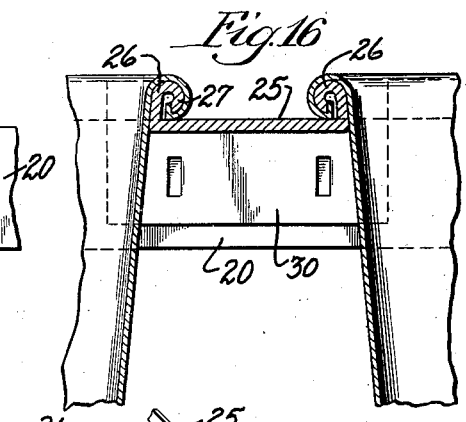
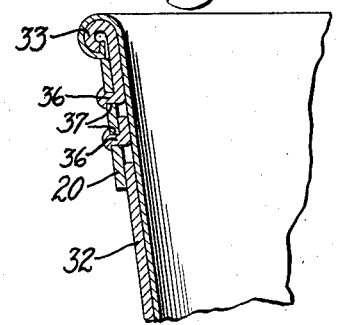
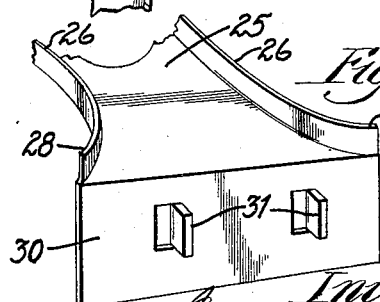
Inventor:
Louis H. Debs Patented Mar. 18, 1930

1,751,268

UNITED STATES PATENT OFFICE

LOUIS H. DEBS, OF CHICAGO, ILLINOIS

BAKING PAN

Application filed September 27, 1928. Serial No. 308,669.

This invention relates to a one-piece baking pan which provides its own reinforcement along the edges and corners thereof. In thus dispensing with an auxiliary reinforcing means, such as a wire or band, my improved pan presents a continuous unbroken edge at its corners, and in addition lends itself to a simple and effective interlock with a frame in which several such pans may be mounted to form a multiple-pan unit. The present invention is concerned also with certain details in a multiple-pan construction, such as a novel form of rivet connection, an improved end protection plate, etc., all of which are more fully hereinafter set forth. A suggestive embodiment of my invention is illustrated in the accompanying drawings in the manner following:

Figure 1 is a view of the blank from which one of the present pans is formed;

Fig. 2 is a fragmentary plan view of the blank as it appears when the pan sides and ends are first formed up;

Fig. 3 is an enlarged detail in section taken on line 3 of Fig. 2;

Fig. 4 which is a detail in perspective of the pan corner shows the adjacent upper edges with a lead formed thereon;

Fig. 5 is a similar view showing the pan corner advanced to a further stage;

Fig. 6 shows the pan corner completed;

Fig. 7 is an enlarged detail in plan showing the completed pan corner;

Fig. 8 is a detail in section on line 8 of Fig. 7;

Fig. 9 is an end elevation of several pans mounted in a unitary frame to produce a multiple-pan structure;

Fig. 10 is an enlarged detail in section on line 10 of Fig. 9 showing one of the connecting rivets as it appears when first set in place;

Fig. 11 which is a similar view shows the rivet after being upset;

Fig. 12 is a detail of a rivet having a convex head, as shown in Fig. 10;

Fig. 13 is a similar view of a rivet having a concave head;

Fig. 14 is a perspective view of a multiple-pan unit having a frame which includes a band iron with which is also associated a pair of protection plates;

Fig. 15 which is a detail in section on line 15—15 of Fig. 14 shows one of the protection plates secured in place;

Fig. 16 which is a detail in section on line 16 of Fig. 14 shows one of the braces which extend between adjacent pans;

Fig. 17 is a sectional detail taken on line 17 of Fig. 15; and

Fig. 18 which is a detail in perspective shows the brace construction at one of its ends.

The present pan which is formed from a blank of sheet metal having a contour as represented in Fig. 1 is provided with a bottom 15, and opposite sides and ends 16 and 17, respectively. The ultimate lines of bend which, for the sake of convenience, are indicated by dotted lines on the blank of Fig. 1, include bottom bends $a$, other bends $b$ at the extremities of the pan ends, bends $c$ at the extremities of the pan sides, and a return bend $d$ along the edges of the corner folds. The first forming operation produces the structure of Fig. 2 having outstanding corner folds of two plies comprising the triangular portions $x$ and $y$ between the bend lines $b$ and $d$, and $c$ and $d$, respectively. The outline of the blank is such that the top edge $x'$ is, in the stage of Fig. 2, below the corresponding edge $y'$ of the other fold component $y$, there being a slanting edge portion $y''$ extending from one to the other, as best indicated in Fig. 3.

From the form of Figs. 2 and 3, the pan is advanced to a succeeding stage shown in Fig. 4 wherein a lead 18 is produced in the top edges of the sides and ends. Thereafter the corner folds are bent around to lie against the ends, as shown in Fig. 5, and in the next operation the pan edges are curled over in the direction of the lead to take the form which is shown in Figs. 6 and 7. It is to be noted that because the top edge $x'$ of the triangular component lies below the edge $y'$ of the adjacent component, the lead along the corner folds consists of but two thicknesses of metal (see Fig. 5). This is important because the curling of the edge, as represented in Figs.

6, 7, and 8, is thereby facilitated and a neater and more attractive product is assured. The curled edges of the side walls 16 are rounded at the corners, and are enveloped for a distance by the curled edges of the end walls 17, as shown clearly in Figs. 6 and 7. No reinforcement of any kind is required for a curled edge of this character. Near the corners where protection is most needed the material continues around without a break and the folds supply an extra thickness of metal to strengthen the pan edge.

A pan produced in accordance with the preceding description may be united in a row with others of like construction, as suggested in Fig. 9. For this purpose, I utilize a common supporting frame which may include an iron band or strap 20 which is extended along the sides and ends of the pan row. Such a band may have its upper edges rested against the under face of the shoulder formed by the curled edges of the several pans, as shown in Fig. 10, and any appropriate means may be used for securing the band to the pans. An improved fastening for this purpose is suggested in Figs. 10 to 13 wherein I have shown a rivet 21 having a pre-formed head 22 which is curved either convexly, as in Figs. 10 and 12, or concavely, as in Fig. 13, the thickness of the head being substantially uniform in either case. Such a rivet may be inserted through a pan adjacent its corners so as to pass through the extra thicknesses afforded by its folds, and also through the band iron frame which is arranged exteriorly thereof. Preferably a recess or seat 23 for the rivet head is prearranged by the use of an appropriate die so that the rivet will initially occupy a position as shown in Fig. 10. Thereafter when the rivet end is upset, two things will happen: its outer end 24 will be spread, as shown in Fig. 11, and the head 22 will be flattened out to substantially the form which is shown in the same figure. This final flattened form will be reached regardless of whether the head be initially convex, as shown in Fig. 12, or concave, as shown in Fig. 13. In either case, the flattening of the head will cause a spreading of its edges without any appreciable displacement of the metal. The result of this operation is that the rivet head will be tightly fitted within the recess or seat which is provided in the pan walls for its reception. By this construction the rivet head is seated snugly and with an improved fit within the pan recess, so as to avoid protruding upon the inner face of the pan wall; by this construction also I eliminate any crevice between the rivet head and the pan, thereby obviating possible accumulation of dirt and grease.

It is contemplated that a series of rivet connections, one for each of the folds at the pan ends, will be arranged between the band iron frame and the pans which are mounted therewithin. This means of connection is best illustrated in Fig. 9. Another form of connection between the pans and band iron frame is suggested in Figs. 14 to 18 inclusive to which reference will now be made. The pans therein shown may be of the general kind already described, in that their edges are curled over to provide their own reinforcement without the aid of any supplementary means, such as a round wire.

As shown in Fig. 14, I position a channel brace 25 of sheet metal having its side walls 26 curled over at 27 and under the curled edges of the pans to which it is connected. By intercurling in this manner the side walls of the brace and the edges of the pan walls, the two parts are interlocked so that the brace serves as a medium of connection between the adjacent pans. As suggested in Fig. 18, at their ends the side walls 26 of the channel brace are curved outwardly at 28 in general conformity with the curvature of the pan corners, these walls stopping approximately flush with the outer face of the pan ends. The horizontal main wall of the brace is desirably formed with elongated slots 29 so as to provide ventilating apertures. The ends of the main wall are initially provided with depending ears 30 adapted to lie approximately flush with the outer face of the pan ends. From these ears one or more lugs 31 are struck outwardly in position for insertion through registering slots in holes in the band irons, the ends of these lugs being thereafter clinched or upset to establish a secure connection between the brace ends and the band iron frame.

At each end of the pan row I may arrange a protection plate 32. As shown, this plate is secured in place by having its upper edge 33 intercurled with the corresponding edge of the adjacent pan side 16 after the manner already described in connection with the brace of Fig. 16. This protection plate may extend downwardly and then inwardly, as shown, to provide a lip 34 which underlies the lower edge of the end pan. In addition, I have shown at each end of the protection plate an ear 35 which is extended laterally along the proximate end walls 17 of the adjacent pan. These ears may desirably be of triangular form and along their upper edges are intercurled with the corresponding edges of the pan end walls 17. A supplementary connection may also be provided, and, as shown, this takes the form of lugs 36 which are outstruck from the ears for extension through registering holes in slots 37 in the band iron frame. When the ends of the lugs are clinched or upset the connection thus provided becomes fast. It will be noted that the end protection plates constructed as described afford also a protection which extends around the corners of the multiple-pan unit, and that the ears which are fastened to the band iron frame at points remote from the ends of the pan row serve also to secure the end protection plates against movement from the position shown.

The present invention is advantageous in that each pan may be formed with an edge reinforcement which requires no separate or additional parts, the gap usually found in rectangular pans having a wire reinforced edge may be entirely closed so as to provide a more sanitary construction, and the operations employed in producing a pan of this character are few and simple so as to reduce the manufacturing cost of the article. In addition a pan of this kind lends itself to a novel and improved securement within a frame which carries other like pans, the means employed in connecting the pans in place being inexpensive, quickly applied, and highly suitable to meet all service conditions.

I claim:

1. A one-piece sheet metal pan having upstanding angular walls with excess of material arranged in two ply folds adjacent the pan walls, one ply being extended upwardly beyond the other which stops short of the edge of the proximate wall, the edges of the pan, including those of the higher fold plies, being curled laterally to provide a curved reinforcement extending around the pan edges and corners.

2. A one-piece sheet metal pan having upstanding angular walls with excess of material arranged in two ply folds adjacent the pan walls, one ply being extended upwardly beyond the other which stops short of the edge of the proximate wall, the edges of the pan including the edge of the higher fold plies being curled outwardly, and the curls of the one being interlocked with the curls of the other to provide a curved edge reinforcement extending continuously around the pan and corners thereof.

3. A one-piece sheet metal pan having upstanding angular walls with excess of material at the corners arranged in two ply folds adjacent certain of the pan walls, one ply of each fold being extended upwardly in alignment with the edges of the proximate pan wall and the other fold ply having its upper edge terminating therebelow, the edges of the pan being outwardly curled all around and around the corners thereof with the proximate edge of each fold ply curved under and interlocked with the edge curl of the proximate wall.

4. The method of producing a one-piece sheet metal pan having a self-reinforcing edge which consists in forming from a suitable blank of material a plurality of angular marginal walls having at each corner a two ply fold which is bent against one of the adjacent walls, one of the plies of each fold being extended upwardly for a distance less than the vertical height of the marginal walls of the pan, in forming an outwardly directed lead upon the edges of the pan walls and the edges of the higher fold plies, and curling outwardly the pan edges including the edges of the higher fold plies, the curls so produced extending continuously along the pan edges and around the corners thereof.

5. The method of producing a one-piece sheet metal pan having a self-reinforcing edge which consists in forming up from a suitable blank a plurality of walls in angular relation, the excess of material adjacent each corner of the pan being extended outwardly in the form of a fold having two plies one of which is adapted to present its upper edge in alignment with the corresponding edge of the pan walls and the other of which has its upper edge terminating at a point therebelow, in bending around the folds to a position adjacent certain walls of the pan, in forming an outwardly directed lead on the edges of the pan walls, including the edges of the higher fold plies, and thereafter curling over all such edges to provide continuously around the pan edges and corners thereof a curved reinforcement with the top edge of the higher fold plies interlocked with the edges of the proximate pan sides.

6. The method of producing a one-piece pan having a self-reinforcing edge which consists in forming from a suitable blank of sheet metal a plurality of angular marginal walls having at each corner a two ply fold, in bending the folds around adjacent certain of the pan sides, and in curling outwardly the edges of the several walls and proximate edges of the folds in such manner as to interlock the fold edges with those of the adjacent pan sides.

In testimony whereof, I have hereunto set my hand this 22 day of September, 1928.

LOUIS H. DEBS.